United States Patent
Caldwell

[15] 3,699,370
[45] Oct. 17, 1972

[54] HOMOPOLAR GENERATOR

[72] Inventor: Deane B. Caldwell, 3908 Wythe Avenue, Richmond, Va. 23221

[22] Filed: March 3, 1971

[21] Appl. No.: 120,617

[52] U.S. Cl.................................310/178, 310/268
[51] Int. Cl............................................H02k 31/04
[58] Field of Search..............310/219, 231, 178, 268

[56] References Cited

UNITED STATES PATENTS

| | | | |
|---|---|---|---|
| 338,169 | 3/1886 | Forbes | 310/178 |
| 3,096,454 | 7/1963 | Sears | 310/178 |
| 3,293,470 | 12/1966 | Polgreen | 310/178 |
| 3,469,137 | 9/1969 | Huhta-Koivisto | 310/178 |
| 2,755,398 | 7/1956 | Merunovich | 310/178 |

OTHER PUBLICATIONS

Theory and Calculation of Elec. Apparatus, Steinmetz, McGraw-Hill, New York, 1917, pp. 450- 455.

Primary Examiner—D. F. Duggan
Attorney—Pennie, Edmonds, Morton, Taylor and Adams

[57] ABSTRACT

A homopolar generator having a rotor with a disc shaped portion which rotates in a stator. A magnetic field is induced in the rotor and stator by at least one field winding which may be mounted about the rotor or on the stator or on both. A pair of annular bus bars are situated adjacent to and on opposite sides of the disc shaped portion of the rotor for collecting the generated current passing through the rotor. A liquid metal brush interfaces the disc portion of the rotor and the bus bars for an efficient conduction of current therebetween. The internal resistance of the generator is substantially reduced since the length of the current path through the disc is relatively small compared to the cross-sectional area thereof.

In one embodiment the field windings are mounted about the stator which windings generate a magnetic field that is cut by the rotating disc portion of the rotor thereby generating a current in the rotor which passes from one side to the other side of the disc substantially transverse to the direction of the magnetic flux lines and the rotation of the rotor. In a second embodiment the field windings are mounted about the rotor and therefore a rotating magnetic field is generated which field rotates with the rotor and cuts once each revolution of the rotor, a pair of but bars which extend through the stator thereby generating a current in the bus bars.

14 Claims, 4 Drawing Figures

INVENTOR
DEANE B. CALDWELL

INVENTOR
DEANE B. CALDWELL

INVENTOR
DEANE B. CALDWELL ic generator.
HOMOPOLAR GENERATOR

BACKGROUND OF THE INVENTION

This invention relates to an improved low voltage, DC generator commonly referred to as a homopolar or acyclic generator.

It further relates to an improved homopolar generator for generating a high electrical current, such as, for example, 1,000 amperes or more, for powering an external unit.

Electrically operated devices utilized in industry often require large quantities of current at low voltage. Thus, for example, in the aluminum industry, each pot for making aluminum typically operates at 6 volts DC and utilizes current in excess of 1,000 amperes and often requires 50,000 amperes or more. Typically, this power has been supplied from 660 volt generators and, therefore, 110 such aluminum pots must be ganged in series in order to provide each pot with the appropriate voltage. Such generators are typically either of the mentioned DC type employing commutators which are very inefficient at lower voltages or they are AC generators used in conjunction with complex and expensive rectifiers to convert the AC current to DC.

DC generators usually have a plurality of pairs of poles arranged in equidistant and spaced relation to each other about an axis for generating a magnetic field. Each pole piece has a field winding thereon wound so that the pole members are alternately of opposite magnetic polarity. Thus, when the rotating armature of the generator moves past the successive pole pieces, the current generated in each armature conductor alternately reverses direction. The reversing current is converted to a direct current by a commutator. The commutator bars are inherently inefficient devices particularly at low voltages and do not produce a perfectly steady or acyclic current output. In addition, such machines require a large capital investment and, thus, only the large, financially able corporations have been able to produce aluminum. Accordingly, a need has arisen for the generation of a high current at low voltages by an efficient and economical means.

One such device for producing high currents at a low voltage is a homopolar or acyclic generator. Knowledge of homopolar generators has existed from the early history of machines for generating electrical power. The early homopolar generators consisted fundamentally of a disc conductor rotating in a magnetic field so that the conductor cut the lines of magnetic flux thereby causing a voltage to be generated between the center and the periphery of the disc. In these early generators the path of current through the generator was typically long in relation to the path's cross-sectional area. Accordingly, the internal resistance of the generator was relatively high and consequently such generators were highly inefficient. Because of the high internal resistance, an elaborate cooling system was required and therefore past homopolar generators were relatively uneconomical.

It, therefore, is an object of this invention to provide a DC generator capable of efficiently producing large quantities of current at low voltages.

It is another object of this invention to provide a homopolar generator capable of efficiently generating large quantities of current with low internal generator resistance.

It is yet another object of this invention to provide a homopolar generator capable of generating large quantities of DC current efficiently and with a minimum of heat loss by means of a rotating magnetic field.

SHORT STATEMENT OF THE INVENTION

Accordingly, this invention relates to an improved homopolar generator having a rotor with a disc shaped portion which rotates in a stator. A magnetic field is induced in the rotor and stator by at least one field winding which may be mounted about the rotor or on the stator or on both. A pair of annular bus bars are situated adjacent to and on opposite sides of the disc shaped portion of the rotor for collecting current passing therethrough which current is delivered to a load through connecting bus bars which pass through the stator to the load. A liquid metal brush interfaces the disc portion of the rotor and the bus bars for efficient conduction of current therebetween. The internal resistance of the generator is minimized since the length of the current path through the rotor disc is relatively small compared to the cross-sectional area of the current path.

When the field windings are mounted about the rotor, a rotating magnetic field is induced which passes through the rotor and the stator and once each cycle cuts bus bars which pass through the stator of the generator. Thus, an electric current is induced in the bus bars which is conveyed to a load. If the field windings are mounted about the stator, as opposed to the rotor, the flux lines induced in the stator cut the rotating disc portion of the rotor thereby generating a current in the disc portion of the rotor which is conveyed to a load through the bus bars positioned to each side of the disc.

BRIEF DESCRIPTION OF THE DRAWINGS

Other objects, features and advantages of this invention will become more fully apparent from the detailed description, appended claims and the accompanying drawings in which:

DETAILED DESCRIPTION

Figure 1:
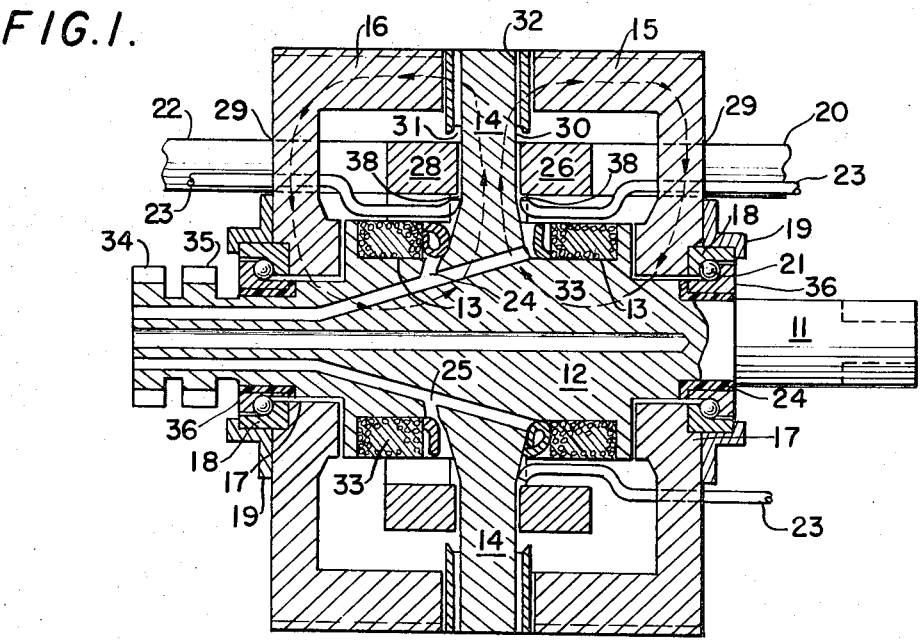
FIG. 1 is a section view of the homopolar generator of this invention having a rotating field.

Refer now to FIG. 1 which shows a cross-sectional view of the homopolar generator of this invention. A rotor 11 is shown having an enlarged body portion 12 with a pair of circumferential troughs 13 proximate the ends thereof. The rotor has a disc shaped portion 14 approximately at the center of the rotor's longitudinal axis; the disc separating the troughs 13. The disc has generally flat, parallel sides extending outwardly away from the body of the rotor with the thickness of the disc being relatively small compared to the surface area thereof. A stator comprising two electromagnetic yokes 15 and 16 are situated such that they are separated by the outer periphery of the disc portion 14 of the rotor. The yokes each have a generally cup-shaped configuration with a hole 17 through the center of each for receiving the rotor 11. Each yoke also has a second hole 29 therethrough for receiving bus bars 20 and 22, respectively. The holes 29 may be lined with a soft iron material to provide magnetic isolation of the field generated by the current passing through the bus bars 20 and 22.

A bearing race 18 is secured to each yoke by means of an annular bearing support 19. A complementary bearing race 36 is secured to a sleeve consisting of non-magnetic, non-conducting material, such as, for example, Nylon in order to insulate the ball bearings from the magnetic field induced in the rotor 11. The nylon sleeve is fixedly secured to the rotor 11. The races 18 and 36 are positioned to form a circular sleeve in which are deposited a plurality of ball bearings for permitting smooth rotation of the rotor 11 in the yokes 15 and 16 with a minimum of friction.

In the first embodiment, a pair of field coils 33 are wound in each of the troughs 13 in such a direction that when current is fed thereto a magnetic field is generated in the direction shown by the dotted lines, i.e., the flux field is unidirectional in the disc. It should be understood that the flux field may be reversed so that the unidirectional flow of the field will be in the opposite direction, i.e., flowing, inwardly toward the core of the rotor from the periphery thereof. The field coils are secured in the troughs by any one of a number of known techniques, such as, for example, by an adhesive or a potting compound or by a suitably strong banding material wrapped about the outer periphery of the field windings. Excitation current is fed to the generator field windings 33 from an external source through a pair of slip rings 34 and 35 and then through conductors positioned in conduits 24 and 25.

The bus bars 20 and 22 which are stationary are formed in any suitable manner such as by multiple copper cables or by a solid conductive bar and are connected to the device or load utilizing the generated electric current. Tubes 23 are placed proximate the base of the disc 14 as shown for permitting the passage of a liquid conductive metal from a suitable pump (not shown) to the walls of the disc portion 14 of the rotor. The liquid metal serves as an electrical contact between the annular portions 26 and 28 of the bus bars 20 and 22, respectively, and the rotating disc 14. The liquid metal passes from tubes 23 into the openings designated by the numeral 38 and because of the centrifugal force of the rotating rotor, the liquid metal passes between and in contact with the disc 14 and the annular portions 26 and 28 of the bus bars. In addition, because of the rotational speed of the disc, the liquid metal will spread over the surface of the disc in an angular direction thereby forming a liquid brush which covers the entire disc and provides an efficient electrical interface between the disc and the bus bars. The liquid metal is captured in a pair of annular troughs 30 and 31 which are integral with the disc. The metal then flows through a plurality of channels 32 extending from the trough to the external periphery of the disc 14 and into a tank (not shown) surrounding the generator for recirculation back to tubes 23. The liquid metal is recirculated from the tank to the generator by means of a pump (also not shown). The liquid metal preferably comprises a sodium potassium alloy although other liquid metals may be used. The liquid must be compatible with the metal in the machine, tank and the channels 23 used for circulating the liquid in the generator. Such liquids may, also, comprise gallium, mercury, tin, bismuth or any other metal having the characteristics of being a good wetting agent of high conductivity, low viscosity, being relatively inert and having a wide temperature range between the boiling and freezing point. It should be understood that the illustration of the circulation system in FIG. 1 is only one of a number of different possible embodiments for providing a highly efficient "brush" for providing an electrical contact between the rapidly rotating disc portion 14 of rotor 11 and the bus bars 26 and 28.

Figure 2:
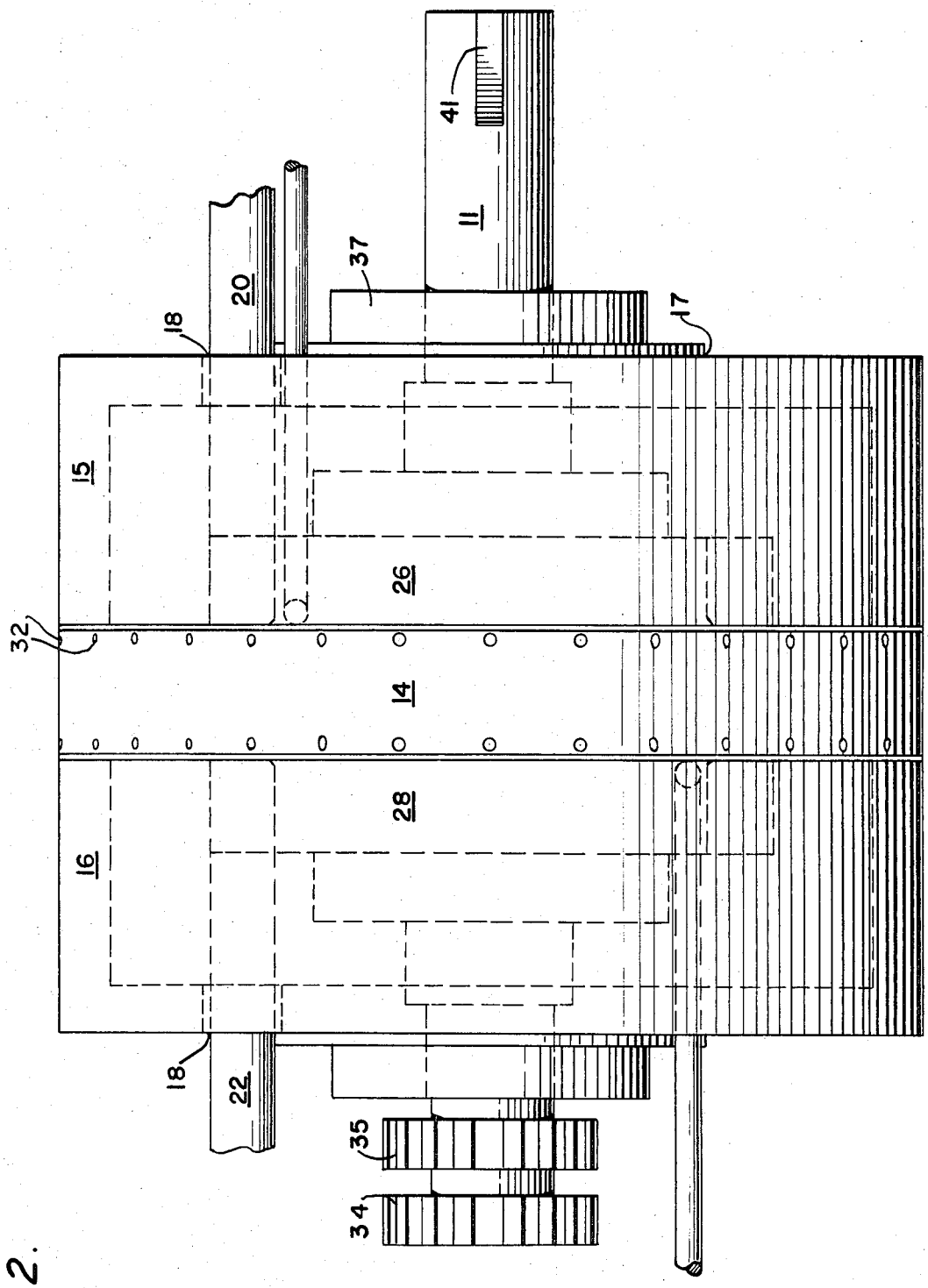
FIG. 2 is a plan view of the homopolar generator of FIG. 1.

Refer now to FIG. 2 which shows a plan view of the generator illustrated in FIG. 1. The disc portion 14 of rotor 11 is shown having a plurality of holes 32 therein for passing liquid metal from the troughs 30 and 31 on the interior walls of the disc to an external tank (not shown). Yokes 15 and 16 which comprise the stator of the generator are shown separated by and adjacent to the disc 14 of the rotor. Yoke 15 is shown having a generally cup-shaped configuration and having an aperture 17 for carrying the rotor 11 and the bearing assembly generally designated by the numeral 37 which is associated therewith. Annular portion 26 of bus bar 20 is shown positioned adjacent one side of the disc 14 and is connected to an external utilization device through an insulated passageway through the stator 15. Bus bar 20 may be comprised of a single piece of conductive material such as copper or may be comprised of a plurality of individual conductors connected in parallel. Bus bar 20 may also be magnetically shielded from stator 15 by means of a soft iron shell wrapped around the bus bar thereby preventing the current induced therein from inducing a magnetic field in the stator 15. On the opposite side of disc 14 is the annular portion 28 of bus bar 22 and is connected to the load through the yoke 16.

The rotor is driven by a machine connected to the rotor shaft by means of a keyed slot 41. At the opposite end of the generator a pair of slip rings 34 and 35 are shown which convey current to a pair of field windings 33 through a pair of conduits 24 and 25 shown in FIG. 1.

When current is fed to the windings, two annular donut-shaped magnetic fields are induced one of which passes through yoke 15 of the stator and the other through yoke 16 with each of the fields passing in common through the disc portion 14 of the rotor. As the rotor rotates, the field rotates therewith thus providing a homopolar generator having a rotating field. As the two magnetic fields rotate with the rotor, the lines of flux cut the bus bars 20 and 22 where they pass through holes 17 thereby generating an EMF in the bus bars in accordance with the following formula:

$$E = (NZ\phi \, 10^{-8})/60 \text{ volts}$$

where $N$ equals revolutions of the flux field per minute, $Z$ equals conductors in series which is two as shown in FIG. 1, $\phi$ equals the total flux lines traversing each bus bar and $E$ equals the potential generated in volts between the ends of the bus bars.

Although all the flux lines surrounding coils 33 make a complete revolution for each revolution of the rotor, a heavy concentration of flux lines remains in the yokes 15 and 16 at all times. The number of flux lines in the yokes which are typically of a magnetic material such as iron and the number of flux lines in the air between the yoke and the bus bars is proportional to the permeability of the iron relative to the permeability of air. Thus, the rotational speed of the flux lines traveling through the air space between the bus bars is greater than the speed of the lines traveling through the yoke. The difference in speed is inversely proportional to the concentration of flux lines in each medium.

The shape of the disc 14 provides a very short current path from one surface to the other in which the generated current flows in comparison to the cross-sectional area of the current path through the disc 14 and the bus bars 26 and 28. The formula for resistance is generally given by:

$$R = \rho\,(L/A)$$

where $R$ is the resistance, $\rho$ is a coefficient of resistance, $L$ is the length of the current path and $A$ is the cross-sectional area of the current path. It can thus be seen that the shorter the current path in relation to the cross-sectional area thereof, the lower will be its resistance to the generated current. Thus, the relative shape of the disc portion 14 of rotor 11 should remain substantially the same for various levels of generated current. However, as more current is generated, the width of the disc, i.e., the distance from one surface to the other, is increased to permit more flux lines therein without saturating the disc. Thus, the surface area of the current path must be correspondingly increased by increasing the radial dimension of the disc and by increasing the surface areas of the bus bars 26 and 28.

Figure 3:
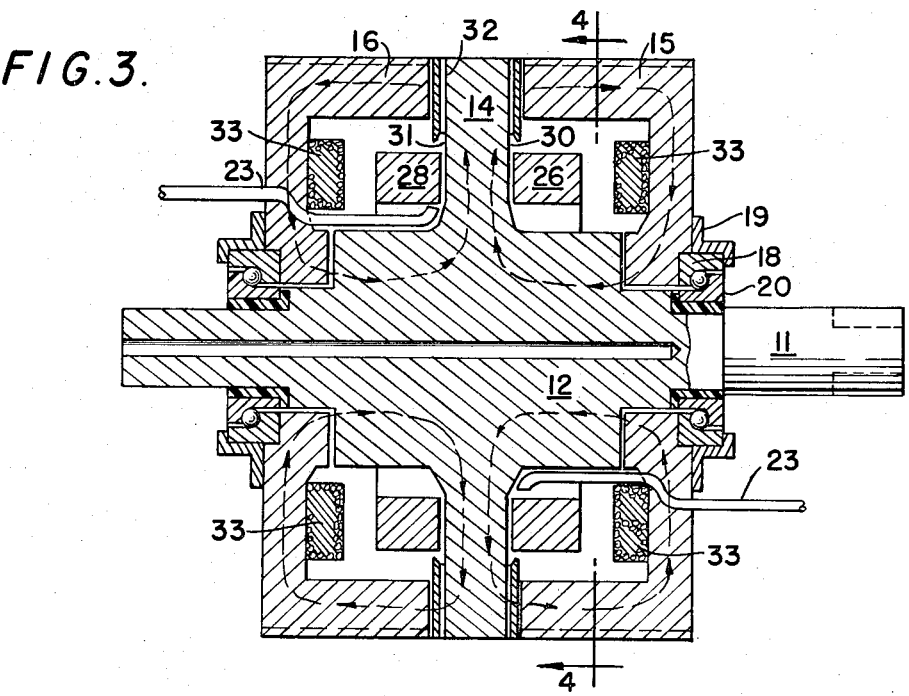
Fig. 3 is a section view of the homopolar generator of this invention with the field windings mounted on the stator.

Refer now to FIG. 3 which shows a cross-sectional view of a second embodiment of the homopolar generator of this invention. A rotor 11 is shown having an enlarged body portion 12 which has a disc shaped portion 14 positioned approximately midway between the ends of the body 12. The walls of the disc shaped portion are substantially parallel. A pair of yokes 15 and 16 are positioned adjacent the disc portion of the rotor and support the body portion of the rotor 12 for rotation within the yokes. The yokes constitute the stator of the homopolar generator. Each of the yokes has a rectangular shape as opposed to the cup-shaped yokes described in connection with the first embodiment. A bearing race 18 is positioned at each end of the machine and is supported by means of an annular bearing support 19. A complementary bearing race is secured to a non-magnetic material, such as, for example, nylon, to form in conjunction with the bearing race 18 a circumferential bearing groove into which are placed a plurality of ball bearings for providing smooth rotation of the rotor within the stators 15 and 16. The Nylon sleeve is rigidly connected to the rotor body 12 by any suitable means. Stator windings are wound about the yokes 15 and 16 for generating a magnetic field in the respective yokes and in the rotor, such as shown in the figure. It is understood that if the windings were wound in the opposite direction, the flux lines would be reversed from that shown in the drawings. The windings may be excited by any suitable means but it should be understood that slip rings will not be required in this embodiment of the invention since the coils remain stationary with respect to time and, in addition, the coils do not have to be secured against a centrifugal force as with the first embodiment. A number of tubes 23 convey a liquid conductive metal to the area between the annular portions 26 and 28 of a pair of bus bars for providing an electrical contact between the disc portion 14 of the rotor and the annular bus bars 26 and 28. The liquid, because of the centrifugal force of the rapidly rotating rotor, flows between the rotor and the annular bus bars into troughs 30 and 31 and is then passed through the rotor by means of channels 32 to a tank external of the motor and which is now shown.

Figure 4:
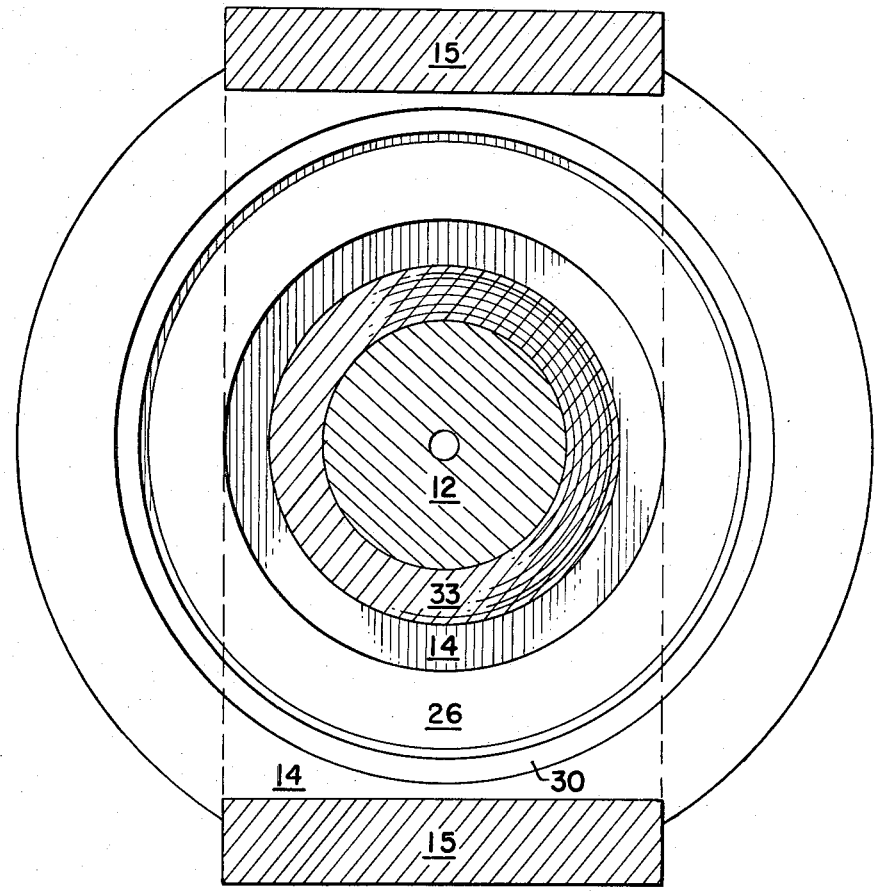
FIG. 4 is a section view taken along the lines 4—4 of FIG. 3.

Refer now to FIG. 4 which shows a section view of the homopolar generator of FIG. 3 taken along the lines 4—4. The rotor 11 is shown mounted in the yoke 15 of the stator. An annular bus bar 26 is shown positioned adjacent the disc portion 14 of the rotor for collecting current generated therein. Not shown is a pair of bus bars such as shown in FIG. 1 which convey generated electrical energy from the annular bus bars to a load device. The stator 15 is shown having a generally rectangular shape as opposed to the cup-shaped stator of the generator of FIG. 1.

As the rotor rapidly rotates within the yokes 15 and 16, the lines of flux generated by the field windings 33 cut the disc portion of the rotor 14 thereby generating a current through the disc portion of the rotor which is substantially transverse to the direction of movement of the rotor and to the direction of the magnetic flux. Because of the relatively short current path through the disc in comparison to the large cross-sectional area through which the current flows, the internal resistance presented by the generator is relatively small and consequently the efficiency of the generator is substantially improved over prior art designs.

It is understood that the field windings can be positioned on both the stator and the rotor simultaneously in order to generate the desired flux field. In such an arrangement, the potential generated in the disc by the stator field coils can be used to excite the coils for the rotating field simply by placing slip rings on each side of the rotor disc between the annular bus bars and the disc.

In this arrangement, the inefficiency of the slip rings supplying current to the rotating field coils can be substantially eliminated since the cross-sectional area of the sides of the disc is large and the efficient liquid metal brushes are already functioning in that location.

It is understood that the rotating field windings can be excited from both the slip rings on the side of the rotor disc and the slip rings 34 and 35 as shown in FIG. 1. In this case, each of the field windings 33 shown in FIG. 1 can be composed of two sets of windings insulated from each other; one set being excited by one set of slip rings and the other set of windings being excited by the other set of slip rings.

It also should be understood that a rotor having more than one disc portion may be utilized within the spirit of the invention. Thus, while the preferred embodiment of the invention has been shown and described, it will be understood that the invention may be embodied otherwise than as is herein illustrated and described.

I claim:

1. A direct durrent generator comprising a rotor, said rotor having a body portion and at least one disc portion, means for rotating said rotor, a stator in which said rotor rotates, a pair of stationary bus bars being positioned on opposite sides of said disc portion of said rotor each being proximate a surface thereof, means for electrically connecting said bus bars to said rotor, and means for establishing a magnetic flux field in said rotor and said stator, said field rotating with said rotor and cutting through said stator and said bus bars, a current being generated in said bus bars when cut by said rotating field said generated current flowing from one surface of said disc to the other forming a current path having a small length and a large cross-sectional area.

2. The generator of claim 1 wherein said bus bars each have an annular portion positioned proximate said disc portion of said rotor.

3. The generator of claim 2 wherein said means for electrically connecting said bus bars to said rotor comprises a liquid conductive metal, and means for distributing said liquid metal between and in contact with said bus bars and said rotor.

4. The generator of claim 3 wherein said means for establishing a magnetic flux field comprises at least one coil mounted about the body portion of said rotor, and means for feeding direct current thereto, said current in said coil inducing a magnetic flux field in said stator and said rotor.

5. The generator of claim 4 wherein field coils are mounted on each side of said disc portion of said rotor such that the magnetic field generated by each coil when current is fed thereto is summed in the disc portion of said rotor.

6. The generator of claim 5 wherein said stator comprises a pair of cup-shaped yokes being positioned on opposite sides of said disc shaped portion of said rotor and each having at least one hole therethrough for receiving said bus bars.

7. A direct current generator comprising a rotor having a body portion and at least one disc portion, means for rotating said rotor, a stator in which said rotor rotates, means for establishing a magnetic flux field in said rotor and said stator, said rotating rotor cutting said magnetic flux field thereby generating a current in said disc, a pair of bus bars being aligned on opposite sides of said disc portion of said rotor each being proximate a surface thereof, and means for electrically connecting said bus bars to said disc portion of said rotor, said generated current flowing from one surface of said disc to the other forming a current path having a small length and large cross-sectional area.

8. The generator of claim 7 wherein said means for electrically connecting said bus bars to said disc portion comprises a liquid metal, and means for forcing said liquid metal between and in contact with said bus bars and said disc portion.

9. The generator of claim 8 wherein said bus bars each have an annular portion having a large surface area adjacent to the surfaces of said disc portion.

10. The generator of claim 9 wherein said means for establishing a magnetic flux field comprises at least one coil mounted on said stator and means for feeding a DC current thereto, said current in said coil inducing a magnetic flux field in said stator and rotor.

11. The generator of claim 10 wherein two field coils are mounted on the stator, said coils being wound so that said flux field in said disc portion is unidirectional.

12. The generator of claim 9 wherein said means for establishing a magnetic flux field comprises at least one coil mounted about the body portion of said rotor and at least one coil mounted on said stator, and means for feeding a DC current thereto, said current in said coils inducing a magnetic flux field in said stator and rotor.

13. The generator of claim 12 wherein said means for feeding a DC current to said coils includes means receiving current generated in said rotor for energizing said rotor coils.

14. The generator of claim 9 further comprising means for shielding the magnetic field generated by said generated current from said stator and rotor.

* * * * *